United States Patent [19]

Pu et al.

[11] 4,209,579
[45] Jun. 24, 1980

[54] ELECTROPHOTOGRAPHIC PHOTOSENSITIVE MATERIAL WITH A QUINOCYANINE PIGMENT

[75] Inventors: Lyong S. Pu; Hitoshi Kamoda, both of Minami-ashigara, Japan

[73] Assignee: Fuji Xerox Co., Ltd., Tokyo, Japan

[21] Appl. No.: 837,336

[22] Filed: Sep. 28, 1977

[30] Foreign Application Priority Data

Sep. 28, 1976 [JP] Japan ................... 51-115448

[51] Int. Cl.$^2$ .................. G03G 5/06; G03G 5/14
[52] U.S. Cl. .................... 430/78; 430/58
[58] Field of Search .................. 96/1.6, 1.5, 1 R

[56] References Cited

U.S. PATENT DOCUMENTS

| | | | |
|---|---|---|---|
| 2,951,841 | 9/1960 | Wilson | 96/133 |
| 3,482,981 | 12/1969 | Van Lare | 96/133 |
| 3,796,573 | 3/1974 | Jones | 96/1.5 |
| 3,879,197 | 4/1975 | Bartlett et al. | 96/1.4 |
| 3,982,935 | 9/1976 | Bartlett et al. | 96/1.5 |

*Primary Examiner*—Roland E. Martin, Jr.
*Assistant Examiner*—John L. Goodrow
*Attorney, Agent, or Firm*—Sughrue, Rothwell, Mion, Zinn and Macpeak

[57] ABSTRACT

An electrophotographic photosensitive material comprising an electrically conductive support having thereon a photoconductive layer containing an organic photoconductive material, in which the photoconductive layer contains in a dispersed state a quinocyanine pigment represented by the following general formula (I)

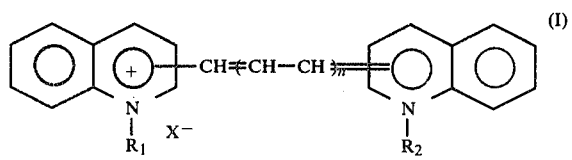

wherein $R_1$ and $R_2$, which may be the same or different, each represents an unsubstituted or substituted alkyl group having 1 to 12 carbon atoms or an allyl group; X represents an anionic functional group selected from the group consisting of $R_3COO^-$, $R_4SO_3^-$, $R_5SO_4^-$ and $NO_3^-$; $R_3$ represents an unsubstituted alkyl group having 1 to 5 carbon atoms, a substituted alkyl group having 1 to 5 carbon atoms in the alkyl moiety thereof, an unsubstituted or substituted phenyl group or a nitrogen-containing heterocyclic group; $R_4$ represents an unsubstituted alkyl group having 1 to 4 carbon atoms or an unsubstituted or substituted phenyl or naphthyl group; $R_5$ represents a hydrogen atom or an unsubstituted alkyl group having 1 to 4 carbon atoms; and the two quinoline nuclei may contain additional substituents; and n is 0 or an integer of 1, 2 or 3.

9 Claims, No Drawings

ELECTROPHOTOGRAPHIC PHOTOSENSITIVE MATERIAL WITH A QUINOCYANINE PIGMENT

BACKGROUND OF THE INVENTION

1. Field of the Invention

This invention relates to electrophotographic photosensitive materials used in electrophotographic processes. More particularly this invention relates to highly-sensitive photoconductive materials which can be used in any of the existing photographic processes and which has a spectral sensitivity over the entire visible light region.

2. Description of the Prior Art

As electrophotographic photosensitive materials, inorganic photosensitive materials such as amorphous selenium, selenium alloys, cadmium sulfide and zinc oxide and organic photosensitive materials which include, typically polyvinylcarbazole and derivatives thereof, are widely known at present.

Amorphous selenium and selenium alloys have very excellent characteristics as electrophotographic photosensitive materials. They are, however, disadvantageous in that their preparation requires complicated processes for deposition and, further, the thus obtained deposited film is not flexible. Further, photosensitive materials of the dispersion type in which zinc oxide is used have a defect in mechanical strength, so that they are not suited for repeated operations as they are.

Polyvinylcarbazole which is widely known as an organic photoconductive material has excellent flexibility, transparency, film-forming properties, etc., but itself exhibits no sensitivity in the visible region. Various sensitizing methods have, therefore, been devised. However, spectral sensitization of polyvinylcarbazole with a sensitizing dye cannot provide a sensitivity which is sufficient, in practice, for electrophotographic photosensitive materials, although the spectral sensitivity region is extended to longer wavelengths to some extent, and is disadvantageous in that light fatigue is marked. Further, chemical sensitization with an electron-accepting compound can provide satisfactory photographic photosensitive materials only from the standpoint of sensitivity, but problems still remain to be solved with respect to mechanical strength, life, etc.

Organic photosensitive materials of the dispersion type have been actively studied, and many reports have been made thereon. However, photosensitive materials having excellent electrical characteristics and satisfactory sensitivity as an electrophotographic photosensitive material have still not yet been obtained. At the present time, it is reported that phthalocyanine exhibits excellent electrophotographic characteristics when used as a photosensitive material of the dispersion type, but the spectral sensitivity of phthalocyanine lies rather toward longer wavelengths and, therefore, it has the defect of poor red-reproducibility.

SUMMARY OF THE INVENTION

Extensive investigations have been made to overcome various problems encountered with the above-described conventional inorganic photosensitive materials, organic photosensitive materials and organic photosensitive materials of the dispersion type and to obtain photoconductive materials which have excellent electrophotographic characteristics as well as flexibility, and as a result, this invention has been achieved.

An object of this invention is to provide extremely highly-sensitive electrophotographic photosensitive materials which have excellent mechanical strength such as wear resistance, which have a flexibility that inorganic photosensitive materials lack, in which the inferior wear resistance and insufficient mechanical strength that are defects of polyvinylcarbazole-trinitrofluorenone organic photosensitive materials are improved, and which have a substantially flat spectral sensitivity over the entire visible light region.

The electrophotographic photosensitive material of this invention comprises a support having thereon a photoconductive layer containing, as an essential component, an organic photoconductive material, in which the photoconductive layer contains in a dispersed state a quinocyanine pigment having a structure represented by the following general formula (I):

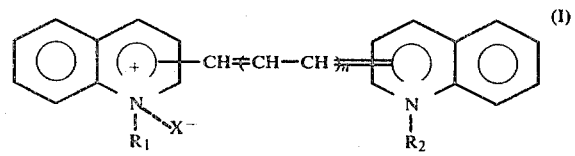

wherein $R_1$ and $R_2$, which may be the same or different, each represents an unsubstituted or substituted alkyl group having 1 to 12 carbon atoms or an allyl group; X represents an anionic functional group selected from the group consisting of $R_3COO^-$, $R_4SO_3^-$, $R_5SO_4^-$ and $NO_3^-$; $R_3$ represents an unsubstituted alkyl group having 1 to 5 carbon atoms, a substituted alkyl group having 1 to 5 carbon atoms in the alkyl moiety thereof, an unsubstituted or substituted phenyl group or a nitrogen-containing heterocyclic group; $R_4$ represents an unsubstituted alkyl group having 1 to 4 carbon atoms or an unsubstituted or substituted phenyl or naphthyl group; $R_5$ represents a hydrogen atom or an unsubstituted alkyl group having 1 to 4 carbon atoms, and the two quinoline nuclei may have additional substituents; and n is 0 or an integer of 1, 2 or 3.

DETAILED DESCRIPTION OF THE INVENTION

In the above general formula (I), examples of unsubstituted alkyl groups having 1 to 12 carbon atoms for $R_1$ and $R_2$ include a methyl group, an ethyl group, a propyl group, a butyl group, etc., and examples of substituted alkyl groups in which the alkyl moiety thereof has 1 to 12 carbon atoms are groups such as —$CH_2C_4H_5$, —$CH_2CH_2Cl$, —$CH_2CH_2COOH$, —$CH_2CH_2CN$, —$CH_2CH_2OH$, etc. Suitable examples of unsubstituted alkyl groups having 1 to 5 carbon atoms for $R_3$ include a methyl group, an ethyl group, a propyl group, a butyl group, etc., and examples of substituents which can be present on the substituted alkyl group having 1 to 5 carbon atoms in the alkyl moiety for $R_3$ and the substituted phenyl group for $R_3$ and $R_4$ include a phenyl group, a naphthyl group, a halogen atom (e.g., fluorine, chlorine, bromine or iodine), an amino group, a carboxyl group, a hydroxyl group, an alkyl group having 1 to 5 carbon atoms, etc.

Examples of carboxylic residues, $R_3COO—$, for X are an acetate group, a propionate group, a butyrate group, a benzoate group, an aminosalicylate group, a hydroxysalicylate group, a phenylacetate group, a naphthylacetate group, an orotate group, a chlorophenoxyacetate group and an aspartate group. Suitable substituents for the substituted phenyl or naphthyl groups for $R_4$ include a ($C_1$–$C_5$) alkyl group, a halogen atom, an amino group, a hydroxyl group, etc. Examples of suitable lower alkyl groups for $R_5$ are a methyl group and an ethyl group.

Where the two quinoline nuclei have additional substituents, such additional substituents include one or more of an alkyl group having 1 to 4 carbon atoms such as a methyl group or an ethyl group, a di-lower alkylamino group in which the alkyl moiety thereof has 1 to 4 carbon atoms such as a dimethylamino group or a diethylamino group, a halogen atom (e.g., fluorine, chlorine, bromine, iodine, etc.), etc.

Specific examples of the quinocyanine pigments represented by the above general formula (I) are shown below in terms of structural formulae. The invention is, however, not to be construed as being limited to these specific examples.

Pigment (1)

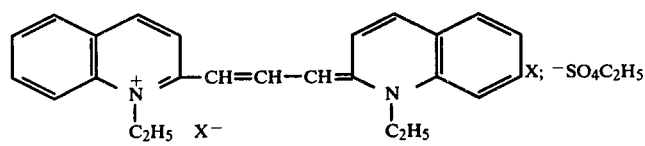

1,1'-Diethylquinocarbocyanine ethylsulfate

Pigment (2)

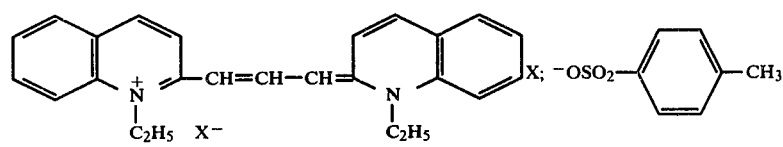

1,1'-Diethylquinocarbocyanine para-toluenesulfonate

Pigment (3)

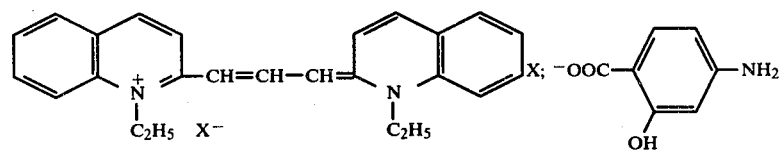

1,1'-Diethylquinocarbocyanine P-aminosalicylate

Pigment (4)

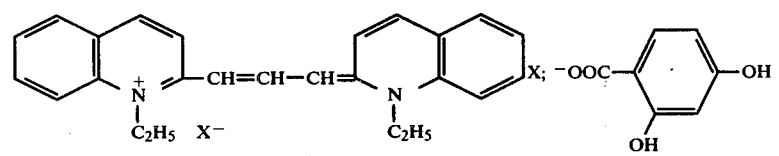

1,1'-Diethylquinocarbocyanine p-hydroxysalicylate

Pigment (5)

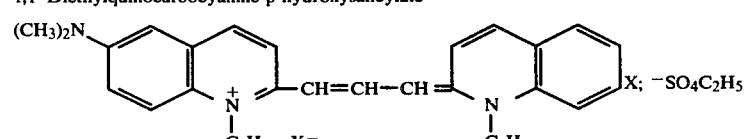

1,1'-Diethyl-6-dimethylaminoquinocarbocyanine ethylsulfate

Pigment (6)

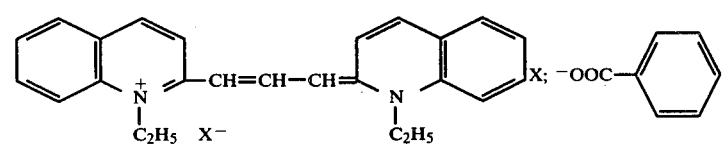

1,1'-Diethylquinocarbocyanine benzoate

Pigment (7)

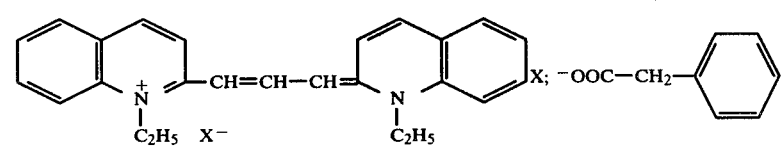

1,1'-Diethylquinocarbocyanine phenylacetate

Pigment (8)

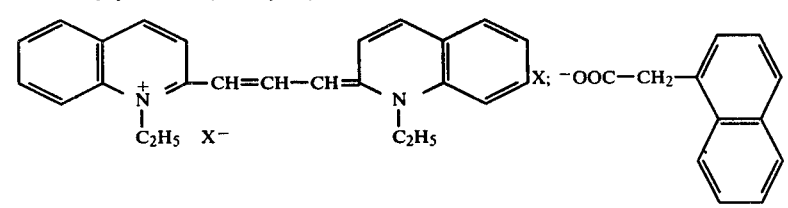

1,1'-Diethylquinocarbocyanine 1-naphthylacetate

-continued

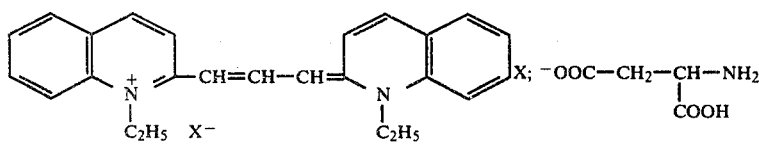
1,1'-Diethylquinocarbocyanine aspartate

Pigment (9)

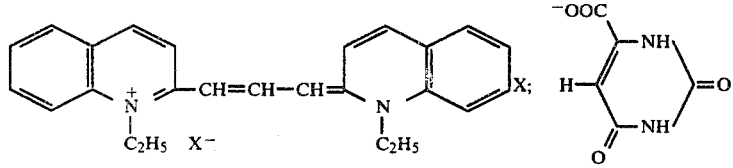
1,1'-Diethylquinocarbocyanine orotate

Pigment (10)

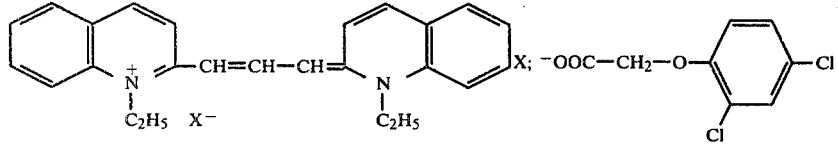
1,1'-Diethylquinocarbocycanine 2,4-dichlorophenoxyacetate

Pigment (11)

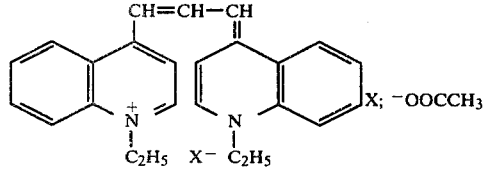
1,1'-Diethyl-4,4'-quinocarbocyanine acetate

Pigment (12)

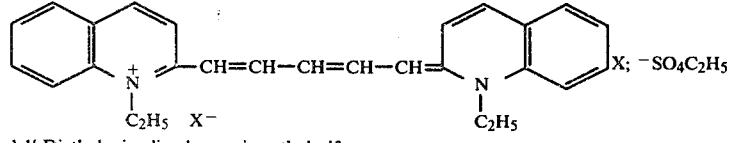
1,1'-Diethylquinodicarbocyanine ethylsulfate

Pigment (13)

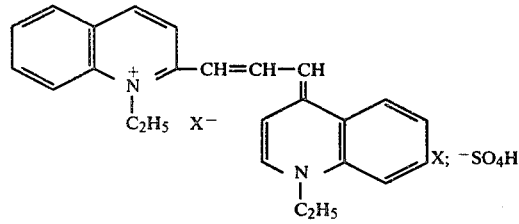
1,1'-Diethyl-2,4'-quinocarbocyanine sulfate

Pigment (14)

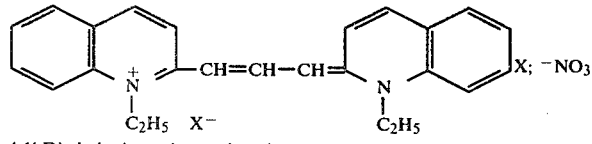
1,1'-Diethylquinocarbocyanine nitrate

Pigment (15)

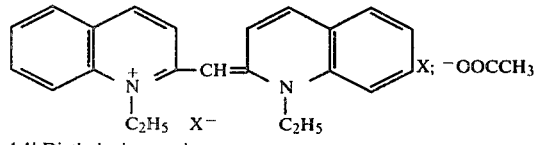
1,1'-Diethylquinocyanine acetate

Pigment (16)

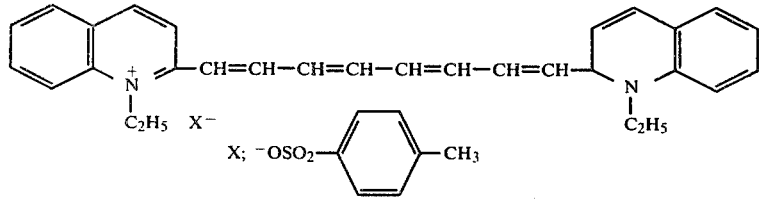

Pigment (17)

1,1'-Diethylquinotricarbocyanine p-toluenesulfonate

Quninocyanines have been long known as dye sensitizers in the silver-salt photographic art and have been widely used, like thiocyanine, oxacyanine, selenacyanine, and the like. However, quinocyanines are not very effective as a dye sensitizer for polyvinylcarbazole which is an organic photoconductive material, and electrophotographic photosensitive materials containing a quinocyanine as a sensitizer which can be put to practical use have not been obtained.

In this invention, the quinocyanine pigment is dispersed in a binder. For dispersion, the quinocyanine pigment is previously ground. Such grinding can be performed by known grinding methods using, e.g., a SPEX MILL (trade name, made by Spex Inc. U.S.A.), RED DEVIL (trade name, made by Red Devil Inc., U.S.A.), a ball mill, or the like. Satisfactory electrophotographic characteristics can be obtained with the quinocyanine pigment with particles of about 5μ or less, preferably 1μ or less. The pigment does not have to be ground to a size on the order of a molecular size, and the grinding into a size near a molecular size rather results in a reduction in electrophotographic characteristics. A ground quinocyanine pigment of a particle size of about 5μ or less is added to a binder in a pigment amount of about 5 to about 90 wt %, preferably 10 to 60 wt %, based on the weight of the photoconductive composition including the binder forming the photoconductive layer, and dispersed in the binder.

The binder per se may or may not be photoconductive. Examples of binders which can be used include known electrically insulating resins such as polystyrene, polyesters, polyvinyl toluene, polyvinyl anisole, polyfluorostyrene, polyvinyl butyral, polyvinyl acetal, polybutyl methacrylate, styrene-butadiene copolymers, polysulfone, styrene-methyl methacrylate copolymers and polycarbonate; and also charge-transporting matrixes such as polyvinylcarbazole, polyvinylcarbazole derivatives, polyvinyl anthracene, polyvinyl pyrene, polyvinyl naphthalene, trinitrofluorenone, etc.

This invention has the advantage that electrophotographic photosensitive materials having the desired mechanical strength can be obtained, since the binder used for forming a photoconductive layer in which the quinocyanine pigment of the above general formula (I) is dispersed in the binder can be appropriately selected from the above-described binding materials.

When a photoconductive polymer is used as a binder, known dye sensitizers can be used in combination therewith. Effective dye sensitizers include triphenylmethane dyes such as Crystal Violet, Malachite Green, Brilliant Green and Acid Violet 6B; xanthene dyes such as Rhodamine B, Rhodamine 6B and Rhodamine B extra; thiazine dyes such as Methylene Blue and New Methylene Blue; and the like. Further, chemical sensitizers can be used in combination therewith. Examples of effective chemical sensitizers include electron-accepting compounds such as trinitrofluorenone, tetranitrofluorenone, dinitrodibenzothiophene dioxide and picric acid. The above described dye sensitizer and the above described chemical sensitizer, of course, can be effectively used at the same time.

In order to further improve the mechanical strength, plasticizers can be used, just as in the case of usual high-molecular weight materials. Chlorinated paraffin, chlorinated biphenyl phosphate plasticizers, phthalate plasticizers, and the like can be used as plasticizers. The plasticizer can be employed in an amount of 0 to about 60 wt % to the weight of the binder.

The binder containing the above-described quinocyanine pigment in a dispersed state is coated on an electrically conductive support. Electrically conductive supports which can be used include metals, papers, high-molecular weight films and Nesa glass whose surfaces are treated so as to be rendered electrically conductive.

According to this invention, the quinocyanine pigment represented by the above-described general formula (I) can also be applied to electrophotographic photosensitive materials having a multilayer structure. That is, as for electrophotographic photosensitive materials which contain a photoconductive layer having a two-layer structure comprising a charge-generating layer and a charge-transporting layer, an improvement in the charging property, reduction of residual potential, further, an improvement in mechanical strength, and the like, can be achieved by incorporating the above described quinocyanine pigment in the charge-generating layer and the charge-transporting layer of, e.g., polyvinylcarbazole.

The following examples are given to illustrate this invention in more detail. Unless otherwise indicated herein, all parts, percents, ratios and the like are by weight.

EXAMPLE 1

Pigment (2) described hereinbefore was placed together with tetrahydrofuran (THF) and steel balls in a test tube and ground for 24 hours using a RED DEVIL (trade name) mixer. The ground Pigment (2) was mixed with a binder, Du Pont Mylar 49000, dissolved in tetrahydrofuran (THF), the amount of the Pigment (2) used being 20 wt % based on the weight of the binder. The mixture was coated on an aluminum plate using an applicator and then dried at 70° C. for 60 min. The thickness of the film formed was about 10μ on a dry basis. The electrical characteristics of the thus obtained photosensitive material were determined using an Electrostatic Paper Analyzer, made by Kawaguchi Electric Co., Ltd. As a result, in the case of positive charging, the amount of exposure required for a reduction of the initial potential by one-half was 1.5 lux·sec.

EXAMPLE 2

Pigment (2) was ground in the same manner as in Example 1. The ground Pigment (2) was mixed with a binder, Du Pont Mylar 49000, dissolved in THF, the amount of the pigment used being 30 wt % based on the weight of the binder. The mixture was coated on an aluminum base and then dried in the same manner as in Example 1. The thickness of the film formed was about 11μ on a dry basis. A determination of the electrical characteristics was made in the same manner as in Example 1. As a result, in the case of positive charging, the amount of exposure required for a reduction of the initial potential by one-half was 1.3 lux·sec.

EXAMPLE 3

Pigment (2) was ground in the same manner as in Example 1. The ground Pigment (2) was mixed with polyvinylcarbazole (PVK) dissolved in THF in an amount of 20 wt % based on the weight of the polyvinylcarbazole. The mixture was coated and dried in the same manner as in Example 1. When the thus obtained photosensitive material was positively charged, the amount of exposure required for a reduction of the initial potential by one-half was 3 lux·sec.

EXAMPLE 4

Pigment (3) as described hereinbefore was ground, coated and dried in the same manner as in Example 1 as a replacement for Pigment (2) used therein to prepare a photosensitive material having a film thickness of about 10μ. The electrical characteristics of the photosensitive material were determined. As a result, in the case of positive charging, the amount of exposure required for a reduction in the initial potential by one-half was 3.2 lux·sec.

EXAMPLE 5

Pigment (4) as described hereinbefore was ground, coated and dried in the same manner as in Example 1 as a replacement for Pigment (2) used therein to produce a photosensitive material. As a result of a determination of the electrical characteristics of the photosensitive material in the case of positive charging, the amount of exposure required for a reduction in the initial potential by one-half was 3.5 lux·sec. (The film thickness was about 9μ).

EXAMPLE 6

Pigment (6) as described hereinbefore was ground, coated and dried in the same manner as in Example 1 as a replacement for Pigment (2) used therein to prepare a photosensitive material, and a determination of the electrical characteristics of the photosensitive material was made. As a result, in the case of positive charging, the amount of exposure required for a reduction of the initial potential by one-half was 4 lux·sec. (The film thickness was about 10μ).

EXAMPLE 7

Pigment (13) as described hereinbefore was ground and coated in the same manner as in Example 1 as a replacement for Pigment (2) used therein and dried at 100° C. for 20 min. to prepare a photosensitive material having a film thickness of about 10μ. The electrical characteristics of the photosensitive material were determined. As a result, in the case of positive charging, the amount of exposure required for a reduction in the initial potential by one-half was 3.6 lux·sec.

The results obtained in the above examples are summarized in the following Table.

Table

| Pigment No. & Structural Formula | Example No. | Binder Resin | wt % | Initial Potential (V) | Amount of Exposure Required for Reduction by One-half in Initial Potential (lux . sec.) |
|---|---|---|---|---|---|
| (2) | 1 | Mylar | 20 | +1030 | 1.5 |
|     | 2 | Mylar | 30 | +980  | 1.3 |
|     | 3 | PVK   | 20 | +1150 | 3.0 |
| (3) | 4 | Mylar | 20 | +890  | 3.2 |
| (4) | 5 | Mylar | 20 | +920  | 3.5 |

Table-continued

| Pigment No. & Structural Formula | Example No. | Binder Resin | wt % | Initial Potential (V) | Amount of Exposure Required for Reduction by One-half in Initial Potential (lux . sec.) |
|---|---|---|---|---|---|
| (6) 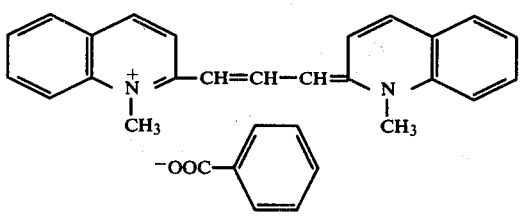 | 6 | Mylar | 20 | +960 | 4 |
| (13) 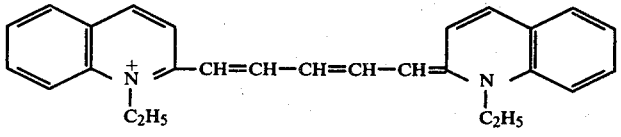 | 7 | Mylar | 20 | +880 | 3.6 |

Mylar = Mylar 49000

EXAMPLE 8

Pigment (2) was ground and mixed in the same manner as in Example 2. The mixture was coated on an aluminum base so as to provide a film thickness of about 2μ on a dry basis and, further, a polyvinylcarbazole layer of about 10μ was provided thereon. The electrical characteristics of the thus obtained photosensitive material were determined. As a result, in the case of negative charging, the amount of exposure required for a reduction in the initial potential by one-half was 5 lux·sec.

EXAMPLE 9

The same procedures as in Example 8 were repeated using Pigment (2) to make a mixture. The mixture was coated on an aluminum base which had a polyvinylcarbazole layer previously formed thereon. After drying at 70° C. for 24 hours, a determination of the electrical characteristics was made. As a result, in the case of positive charging, the amount of exposure required for a reduction in the initial potential by one-half was 3.2 lux·sec.

While the invention has been described in detail and with reference to specific embodiments thereof, it will be apparent to one skilled in the art that various changes and modifications can be made therein without departing from the spirit and scope thereof.

What is claimed is:

1. An electrophotographic photosensitive material comprising an electrically conductive support having thereon a photoconductive layer which consists essentially of an organic photoconductive material and a binder, in which the photoconductive layer contains in a dispersed state a photoconductive quinocyanine pigment having a particle size of about 5μ or less represented by the following general formula (I)

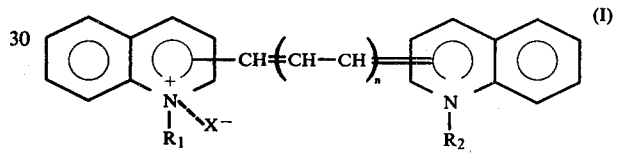

wherein $R_1$ and $R_2$, which may be the same or different, each represents an unsubstituted or substituted alkyl group having 1 to 12 carbon atoms or an allyl group; X represents an anionic functional group selected from the group consisting of $R_3COO^-$, $R_4SO_3^-$, $R_5SO_4^-$ and $NO_3^-$; $R_3$ represents an unsubstituted alkyl group having 1 to 5 carbon atoms, a substituted alkyl group having 1 to 5 carbon atoms in the alkyl moiety thereof, an unsubstituted or substituted phenyl group or a nitrogen-containing heterocylic group; $R_4$ represents an unsubstituted alkyl group having 1 to 4 carbon atoms or an unsubstituted or substituted phenyl or naphthyl group; $R_5$ represents a hydrogen atom or an unsubstituted alkyl group having 1 to 4 carbon atoms; and the two quinoline nuclei may contain additional substituents; and n is 0 or an integer of 1, 2 or 3.

2. The electrophotographic photosensitive material of claim 1, wherein said photoconductive layer comprises a two-layer structure comprising a charge-generating layer and a charge-transporting layer with the quinocyanine pigment represented by the general formula (I) being present in said charge-generating layer of the photoconductive layer.

3. The electrophotographic photosensitive material as claimed in claim 1, wherein said photoconductive layer additionally contains an electrically insulating resin and said quinocyanine pigment represented by the general formula (I) is dispersed in said resin.

4. The electrophotographic photosensitive material as claimed in claim 2, wherein said charge-generating layer additionally contains an electrically insulating resin and said quinocyanine pigment represented by the general formula (I) is dispersed in said resin.

5. The electrophotographic photosensitive material as claimed in claim 1, wherein said photosensitive layer contains a charge-transporting matrix and said quinocyanine pigment represented by the general formula (I) is dispersed in said charge-transporting matrix.

6. The electrophotographic photosensitive material as claimed in claim 3, wherein said electrically insulating resin contains about 5 to about 90 weight % of said quinocyanine pigment represented by the general formula (I).

7. The electrophotographic photosensitive material as claimed in claim 4, wherein said electrically insulating resin contains about 5 to about 90 weight % of said quinocyanine pigment represented by the general formula (I).

8. The electrophotographic photosensitive material as claimed in claim 5, wherein said charge-transporting matrix contains about 5 to about 90 weight % of said quinocyanine pigment represented by the general formula (I).

9. The electrophotographic photosensitive material as claimed in claim 6, wherein said charge-transporting matrix contains about 5 to about 90 weight % of said quinocyanine pigment represented by the general formula (I).

* * * * *